United States Patent
Blind et al.

[11] Patent Number: 5,996,727
[45] Date of Patent: *Dec. 7, 1999

[54] EXTERIOR NOISE ABSORBING COVER FOR AUTOMOTIVE LOUDSPEAKER

[75] Inventors: Henry Francis Blind, Grosse Pointe Woods; David Alan Dage, Southfield; Alan Scott Phillips, Dearborn, all of Mich.

[73] Assignee: Ford Global Technologies, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/352,964

[22] Filed: Dec. 8, 1994

Related U.S. Application Data

[63] Continuation of application No. 08/103,379, Aug. 9, 1993, abandoned.

[51] Int. Cl.$^6$ ............................................. H05K 5/00
[52] U.S. Cl. .................... 181/141; 181/150; 181/156; 181/199
[58] Field of Search .................... 181/141, 148, 181/150, 151, 153, 156, 166, 171, 199

[56] References Cited

U.S. PATENT DOCUMENTS

| | | |
|---|---|---|
| 2,982,372 | 5/1961 | Lowell . |
| 3,554,313 | 1/1971 | Young . |
| 3,595,337 | 7/1971 | Fury et al. . |
| 3,746,125 | 7/1973 | Hammes . |
| 3,993,345 | 11/1976 | Croup ........................................ 181/141 |
| 4,136,755 | 1/1979 | Goes ......................................... 181/141 |
| 4,161,995 | 7/1979 | Pohlmann et al. ....................... 181/150 |
| 4,256,198 | 3/1981 | Kawakami et al. ..................... 181/141 |
| 4,572,326 | 2/1986 | Hutchins ................................. 181/150 |
| 4,790,407 | 12/1988 | Yamamoto et al. ..................... 181/141 |
| 4,928,788 | 5/1990 | Erickson ................................. 181/141 |
| 5,143,169 | 9/1992 | Ziegenberg et al. ..................... 181/144 |

FOREIGN PATENT DOCUMENTS

| | | |
|---|---|---|
| 6321199 | 5/1988 | Japan . |
| 8602508 | 4/1986 | WIPO . |

*Primary Examiner*—Eddie C. Lee
*Attorney, Agent, or Firm*—Mark Mollon

[57] ABSTRACT

A noise absorbing cover is provided for an automotive loudspeaker to prevent exterior noise from being coupled through a loudspeaker to the interior of the automobile. An air gap is provided around the cover to provide a vent to static pressure for the loudspeaker, thereby avoiding any degradation in low frequency performance. The air gap is oriented to exclude direct sound transmission paths for exteriorly generated noise to the interior.

12 Claims, 3 Drawing Sheets

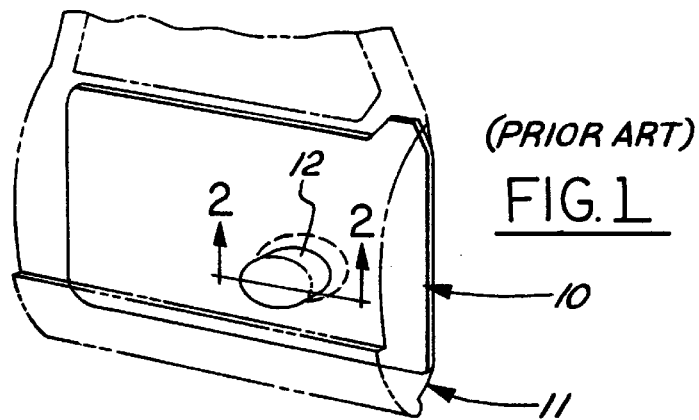
(PRIOR ART)
FIG. 1
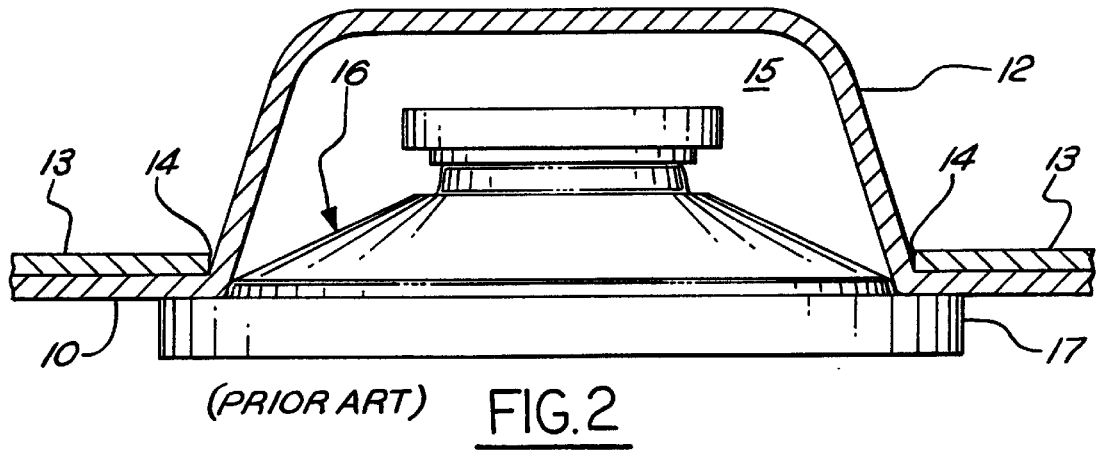
(PRIOR ART) FIG. 2
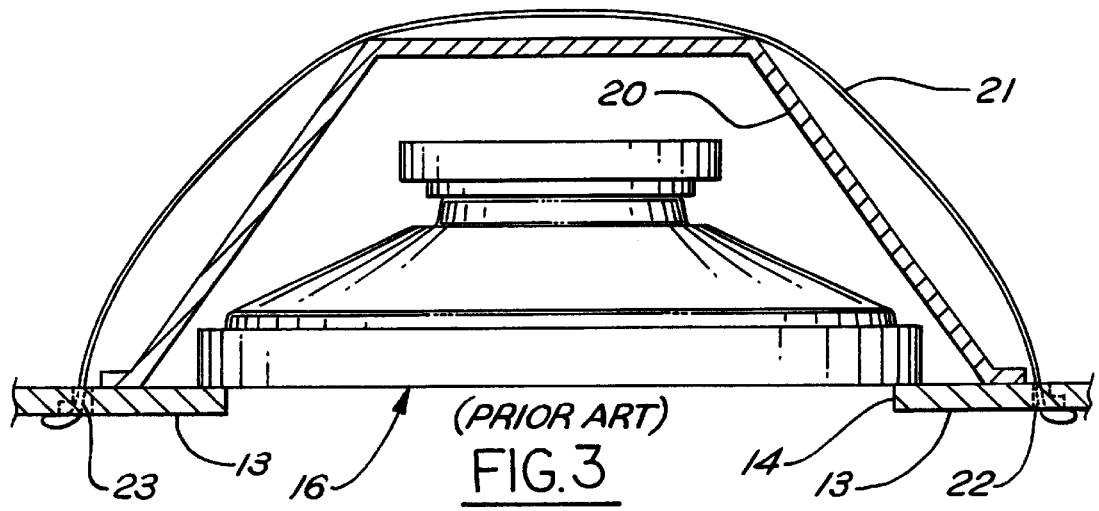
(PRIOR ART) FIG. 3

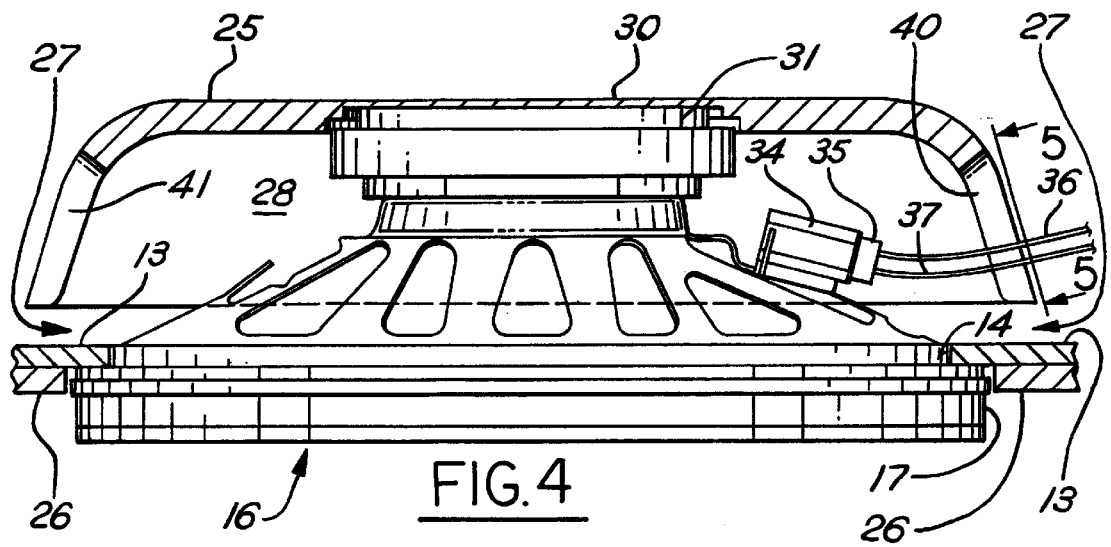
FIG. 4
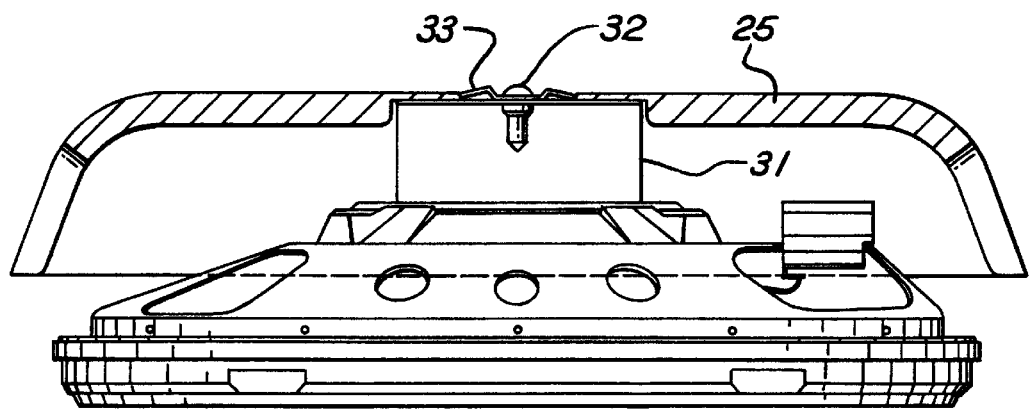
FIG. 6
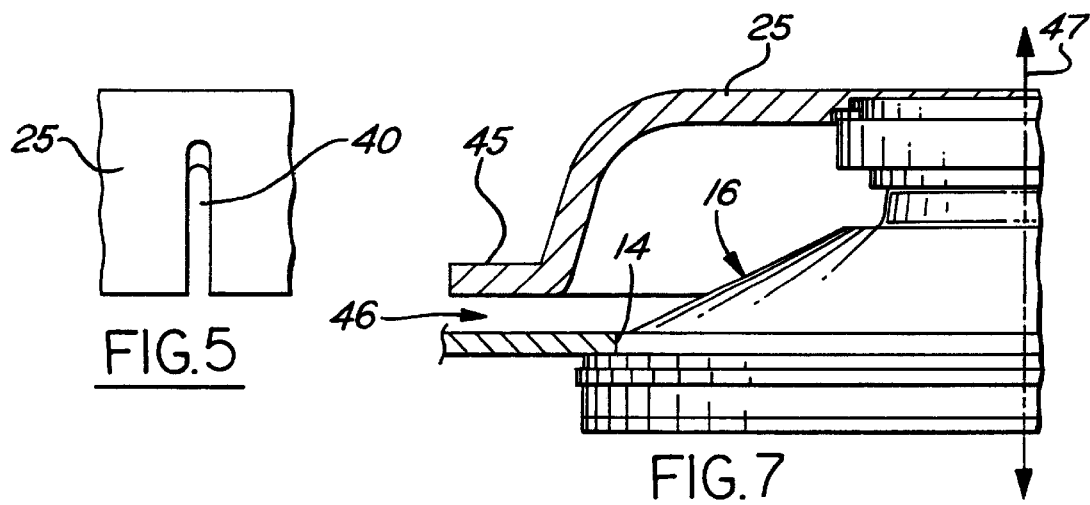
FIG. 5
FIG. 7

5,996,727

EXTERIOR NOISE ABSORBING COVER FOR AUTOMOTIVE LOUDSPEAKER

This is a continuation of application Ser. No. 08/103,379 filed Aug. 9, 1993, now abandoned.

BACKGROUND OF THE INVENTION

The present invention relates in general to the reduction of exterior noise entering the interior of an automotive vehicle, and more specifically to a noise absorbing cover for a loudspeaker.

Noise, vibration, and harshness (NVH) performance is a critical concern in the design of passenger cars and trucks. The primary sources of objectionable noise during driving conditions are road and wind noise originating outside of the vehicle passenger compartment.

Various structures and materials have been employed to block sound energy from entering the passenger compartment such as noise absorbing sheets installed inside vehicle doors and other body panels. Molded cotton or synthetic fiber sheets are often used for their light weight and high coefficient of sound absorption.

Electromechanical speakers are typically mounted in the interior sides of the same vehicle doors and body panels (e.g., rear quarter-panels) that contain noise absorbing sheets. Since the speaker freely transmits sound through its mounting hole, the importance of the noise absorbing sheet at that location is even greater. Thus, prior art noise absorbing sheets have included an integral chamber to receive the rear portion of the speaker.

During operation of the speaker, however, the chamber becomes pressurized because the noise absorbing sheet also blocks the flow of air produced by the vibrating cone of the speaker. The pressurized chamber attenuates the sound production of the speaker at low frequencies, thereby creating a reduction in bass output in the reproduced audio.

SUMMARY OF THE INVENTION

The present invention has the advantage of blocking exterior noise at the location of a loudspeaker without creating audio degradation as in the prior art.

The invention can be employed in a vehicle having a structural panel disposed between the interior and exterior of the vehicle, the panel including an aperture with an axis. A speaker is mounted to the structural panel substantially coaxially with the aperture, the speaker having a front surface acoustically coupled with said interior. A sound absorbing barrier defines a space substantially enclosing the rear of the speaker and has an air gap for venting the space to the exterior. The air gap is arranged to exclude direct sound transmission paths for exteriorly generated noise to the interior. If desired, the structural panel has a second sound absorbing barrier surrounding the aperture.

In another aspect, the present invention provides a method for minimizing exterior noise transmitted into a vehicle through a speaker mounted on a vehicle panel comprising the steps of substantially enclosing a space around the rear of the speaker with a sound blocking material and providing an air gap for venting the space to the exterior side of the vehicle panel, the air gap being arranged to exclude direct sound transmission paths for exteriorly generated noise to the interior.

BRIEF DESCRIPTION OF THE DRAWINGS

FIG. 1 is a perspective view of a prior art sound absorbing sheet installed in a vehicle door.

FIG. 2 is a cross-sectional view of a prior art loudspeaker and sound absorbing sheet taken along line 2—2 of FIG. 1.

FIG. 3 is a cross-sectional view of another prior art loudspeaker and sound absorbing sheet.

FIG. 4 is a cross-sectional view of a loudspeaker and sound absorbing cover of the present invention.

FIG. 5 is a side view of the sound absorbing cover along line 5—5 of FIG. 4.

FIG. 6 is a cross-sectional view of another embodiment of the loudspeaker and sound absorbing cover of the present invention.

FIG. 7 is a cross-sectional view of another embodiment of the loudspeaker and sound absorbing cover of the present invention.

DETAILED DESCRIPTION OF PREFERRED EMBODIMENTS

Figure 8:
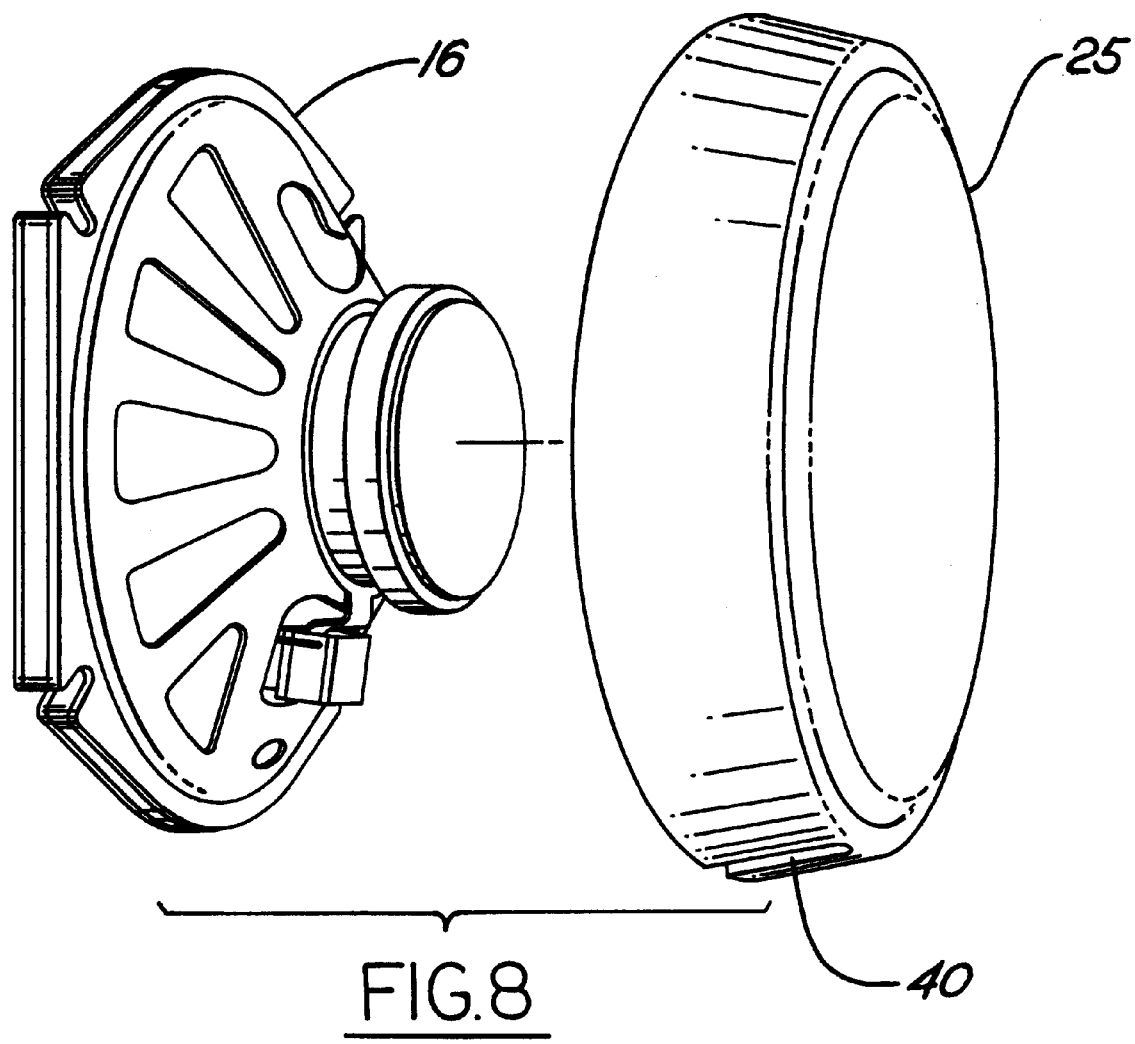
FIG. 8 is an exploded perspective view of the loudspeaker and sound absorbing cover of the present invention.

Referring now to FIG. 1, a prior art noise absorbing sheet 10 is shown in relation to a vehicle door 11 illustrated in phantom. Sheet 10 includes an indentation 12 for receiving the rear structure of a loudspeaker. Door 11 typically includes a structural panel on its interior side comprised of sheet metal. Sheet 10 is typically included in a composite trim panel disposed on the interior side of the door structural panel.

As shown in cross section in FIG. 2, the door structural panel 13 includes an aperture 14 for receiving a speaker 15. Sheet 10 lines the interior side of panel 13. An indentation 12 passes through aperture 14 creating a space 15 for receiving a loudspeaker 16. Speaker 16 includes a mounting flange 17 having a size larger than aperture 14 for mounting rigidly with respect to panel 13.

Panel 13 could alternatively be a rear package tray of a vehicle or a rear quarter panel of a vehicle, or any other vehicle surface for supporting a loudspeaker. In each case, exterior noises from outside panel 13 (i.e., from the top of FIG. 2) would be transmitted through the speaker cone of speaker 16 to the interior passenger compartment (i.e., at the bottom of FIG. 2) if not for indentation 12 of sound absorbing barrier 10. However, since speaker 16 is entirely enclosed at the back, speaker 16 experiences a loss in low frequency output due to the trapped air cavity in space 15. Loss of speaker output occurs between about 25 and 1000 Hz; a maximum loss has been measured of up to 5 dB at frequencies of about 50 to 100 Hz.

Referring to FIG. 3, an alternative prior art embodiment employing a separate speaker cover 20 comprised of sound absorbing material is shown. A spring retaining clip 21 tightly holds cover 20 against panel 13 and has its ends captured in retaining holes 22 and 23 in panel 13. A separate sound absorbing blanket (not shown) may be disposed on panel 13 surrounding aperture 14. Cover 20 may be comprised of a soft fiber mesh glued to a cardboard container to provide structural rigidity.

A first embodiment of the present invention is shown in cross section in FIG. 4. Speaker 16 is again mounted to panel 13 by mounting screws (not shown) passing through mounting flange 17 and panel 13. A sound absorbing cover 25 has a salad bowl shape for substantially enclosing the rear of speaker 16. An air gap 27 is provided at the outside edge of cover 25 for venting a space 28 within cover 25 to external air on the exterior side of panel 13. A noise absorbing sheet 26 is provided on panel 13. Sheet 26 can be disposed on the interior side of panel 13 as shown in FIG. 4, or alternatively can be disposed on the exterior side of panel 13 in which case air gap 27 would be between cover 25 and sheet 26.

Cover 25 and sheet 26 are preferably comprised of a molded, needled reclaimed fiber padding of uniform construction. A homogenous mixture of synthetic and/or natural fibers are needled in a random orientation. The material is treated with a thermal setting resin and then compressed and molded to shape in a heated die set. Applicants have employed a cover comprised of resonated cotton and synthetic fibers providing sound absorption characteristics of 4% at 250 Hz, 12% at 500 Hz, 30% at 1000 Hz, and 63% at 2000 Hz (measured according to ASTM C 384). Thus, noise blocking is achieved primarily for middle and high frequency noises from about 200 Hz to about 20 kHz, which are the most objectionable to the vehicle occupants.

Air gap 27 is oriented such that it excludes sound transmission paths for exteriorly generated noise to the interior; i.e., although air flow through the air gap is permitted to avoid pressurizing space 28, noise blocking is maintained by avoiding direct line-of-sight paths between the exterior noise sources and the cone of speaker 16. This property of the air gap is insured since the footprint of cover 25 projects onto panel 13 and/or sheet 26 to fully block aperture 14. Since higher frequency noises (e.g., greater than about 200 Hz) require direct transmission paths, noise at such frequencies are not transmitted through air gap 27.

Air gap 27 has a total cross-sectional area sufficient to allow unimpaired low frequency output from speaker 16 but small enough to maintain the directional noise reductions characteristics required. The area of air gap 27 need be no larger than the total area of the speaker cone for good low frequency speaker response.

Cover 25 is retained on speaker 16 by attaching a central, narrowed portion 30 of cover 25 to a back plate 31 of magnet 16 by gluing with adhesive, for example. Alternatively, cover 25 may be attached to back plate 31 using a fastener 32 and washer 33 as shown in FIG. 6.

Speaker 16 further includes a receptacle 34 mating with a plug 35 having speaker wires 36 and 37 which carry audio signals for reproduction by speaker 16. Although speaker wires 36 and 37 could pass through air gap 27, cover 25 preferably includes a slot 40 just wide enough for wires 36 and 37 to pass through. Provision of slot 40 avoids deformation of cover 25 by wires 36 and 37 without impacting the noise absorbing performance. Since speaker 16 and cover 25 may preferably be of an oval shape, a slot 41 is provided at the opposite end of cover 25 so that cover 25 can be installed in either orientation. FIG. 5 shows an end view of slot 40 for receiving speaker conductors 36 and 37.

FIG. 7 shows an alternative embodiment of the present invention wherein a flange 45 is provided at the edge of cover 25. An extended air gap 46 is formed comprising an acoustic labyrinth to further reduce the transmission of noise through the air gap, especially including an improvement at lower frequencies. Air gap 46 may comprise any type of flow path to form the acoustic labyrinth so long as at least a portion of the flow path is substantially perpendicular to the central axis 47 of speaker 16 and aperture 14.

FIG. 8 shows an exploded view of cover 24 and speaker 16.

What is claimed is:

1. A vehicle comprising:

a structural panel disposed between an interior and an exterior of said vehicle and including an aperture having an axis;

a speaker mounted to said structural panel coaxially with said aperture, said speaker having a front surface acoustically coupled with said interior and a rear surface acoustically isolated from said interior; and a first sound absorbing barrier defining a space enclosing a rear of said speaker and having an edge defining an air gap for venting said space to said exterior, said first sound absorbing barrier being comprised of a sound absorbing cover having a footprint coinciding with said aperture, said air gap reducing pressurization of said space, and said air gap being oriented to exclude direct sound transmission paths for exteriorly generated noise to said interior;

wherein said air gap comprises a gap between the entire edge of said sound absorbing cover and said structural panel.

2. The vehicle of claim 1 further comprising a second sound absorbing barrier coextensive with said structural panel.

3. The vehicle of claim 1 wherein said sound absorbing cover is comprised of fibrous material.

4. The vehicle of claim 1 wherein said air gap provides a flow path between said space and said exterior, at least a portion of said flow path being perpendicular to said axis.

5. The vehicle of claim 1 wherein said air gap provides a flow path between said space and said exterior, said flow path forming an acoustic labyrinth.

6. The vehicle of claim 1 wherein said sound absorbing cover includes a slot adapted to receive speaker wires for connecting to said speaker.

7. The vehicle of claim 1 wherein said speaker includes a back plate at the rear thereof and wherein said sound absorbing cover is affixed to said back plate.

8. The vehicle of claim 7 further comprising adhesive for affixing said sound absorbing cover to said back plate.

9. The vehicle of claim 7 further comprising fastener means for affixing said sound absorbing cover to said back plate.

10. The vehicle of claim 1 wherein said structural panel provides a door of said vehicle.

11. The vehicle of claim 1 wherein said structural panel provides a rear package tray of said vehicle.

12. The vehicle of claim 1 wherein said structural panel provides a rear quarter panel of said vehicle.

* * * * *